United States Patent
Thomas et al.

(10) Patent No.: US 11,507,445 B2
(45) Date of Patent: Nov. 22, 2022

(54) SYSTEMS AND METHODS FOR DATA QUALITY MANAGEMENT

(71) Applicant: JPMORGAN CHASE BANK, N.A., New York, NY (US)

(72) Inventors: W David Thomas, Glassboro, NJ (US); Pio Abate, Mullica Hill, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/197,711

(22) Filed: Mar. 10, 2021

(65) Prior Publication Data
US 2021/0286663 A1  Sep. 16, 2021

Related U.S. Application Data

(60) Provisional application No. 62/988,289, filed on Mar. 11, 2020.

(51) Int. Cl.
*G06F 11/07* (2006.01)
(52) U.S. Cl.
CPC .......... *G06F 11/076* (2013.01); *G06F 11/079* (2013.01); *G06F 11/0709* (2013.01); *G06F 11/0793* (2013.01)
(58) Field of Classification Search
CPC .. G06F 11/0709; G06F 11/076; G06F 11/079; G06F 11/0793
See application file for complete search history.

(56) References Cited

U.S. PATENT DOCUMENTS

| | | | | |
|---|---|---|---|---|
| 5,396,612 | A * | 3/1995 | Huh | G06F 16/215 |
| | | | | 714/49 |
| 7,149,937 | B2 * | 12/2006 | Oda | G06Q 30/06 |
| | | | | 714/708 |
| 9,286,149 | B2 * | 3/2016 | Sampson | G06F 11/0787 |
| 10,430,271 | B1 * | 10/2019 | Filatov | G06F 11/0793 |
| 2018/0314576 | A1 * | 11/2018 | Pasupuleti | H04L 67/10 |

* cited by examiner

*Primary Examiner* — Joseph R Kudirka
(74) *Attorney, Agent, or Firm* — Greenberg Traurig LLP

(57) ABSTRACT

Systems and methods for data quality management are disclosed. According to one embodiment, a computer-implemented method may include: identifying, by a data quality management engine, a data feed from a data source; defining, by the data quality management engine, a data element in the data feed; identifying, by the data quality management engine, a plurality of processes in a multi-hop process involving the data element; executing, by the data quality management engine, a data quality check on each process of the plurality of processes; identifying, by the data quality management engine, an error rate with one of the plurality of processes; determining, by the data quality management engine, that the error rate exceeds an error rate threshold for the one of the plurality of processes; and executing, by the data quality management engine, an automated action in response to the error rate exceeding the error rate threshold.

16 Claims, 3 Drawing Sheets

SYSTEMS AND METHODS FOR DATA QUALITY MANAGEMENT

RELATED APPLICATIONS

This application claims priority to, and the benefit of, U.S. Provisional Patent Application Ser. No. 62/988,289, filed Mar. 11, 2020, the disclosure of which is hereby incorporated, by reference, in its entirety.

BACKGROUND OF THE INVENTION

1. Field of the Invention

Embodiments relate to analyzing data flow in a computing environment and implementing data quality management processes to identify potential errors in the data.

2. Description of the Related Art

A data feed may be processed by a server using several processes, applications, routines, and manipulations to generate output data. The output data may be subject to compliance, auditing, or other quality or reporting requirements. The output data may have errors, inconsistencies, or quality issues that may go undetected.

SUMMARY OF THE INVENTION

Systems and methods for data quality management are disclosed. According to one embodiment, a computer-implemented method for data quality management may include: identifying, by a data quality management engine, a data feed from a data source; (2) defining, by the data quality management engine, a data element in the data feed; (3) identifying, by the data quality management engine, a plurality of processes in a multi-hop process involving the data element; (4) executing, by the data quality management engine, a data quality check on each process of the plurality of processes; (5) identifying, by the data quality management engine, an error rate with one of the plurality of processes; (6) determining, by the data quality management engine, that the error rate exceeds an error rate threshold for the one of the plurality of processes; and (7) executing, by the data quality management engine, an automated action in response to the error rate exceeding the error rate threshold.

In one embodiment, the data source may include a system, a program, and/or an application.

In one embodiment, the identification of the data feed may further include a manner in which data in the data feed is received.

In one embodiment, the data element may include a data field and/or data in the data field.

In one embodiment, the error rate may be based on a number of times that the process triggers a rule.

In one embodiment, the rule may identify a data element that is an error or an outlier.

In one embodiment, the automated action may include stopping, by the data quality management engine, processing of the data element.

In one embodiment, the step of executing, by the data quality management engine, an automated action in response to the error rate exceeding the error rate threshold may include: identifying, by the data quality management engine, a cause of the error rate, wherein the cause of the error rate is associated with the one of the plurality of processes; and remediating, by the data quality management engine, the cause of the error rate. In one embodiment, the remediation may include restricting a format for data entry for the data element associated with the one of the plurality of processes.

In one embodiment, the automated action may include adjusting, by the data quality management engine, the error rate threshold based on an outcome of the one of the plurality of processes being with tolerance.

According to another embodiment, a data quality management engine may include an electronic device comprising at least one processor and a memory comprising a data quality management computer program. The data quality management engine may be configured to: identify a data feed from a data source; define a data element in the data feed; identify a plurality of processes in a multi-hop process involving the data element; execute a data quality check on each process of the plurality of processes; identify an error rate with one of the plurality of processes; determine that the error rate exceeds an error rate threshold for the one of the plurality of processes; and execute an automated action in response to the error rate exceeding the error rate threshold.

In one embodiment, the data source may include a system, a program, and/or an application.

In one embodiment, the identification of the data feed may further include a manner in which data in the data feed is received.

In one embodiment, the data element may include a data field and/or data in the data field.

In one embodiment, the error rate is based on a number of times that the process triggers a rule.

In one embodiment, the rule identifies a data element that is an error or an outlier.

In one embodiment, the data quality management engine may be configured to stop processing of the data element in response to the error rate exceeding the error rate threshold.

In one embodiment, the data quality management engine may be configured to identify a cause of the error rate, wherein the cause of the error rate is associated with the one of the plurality of processes, and remediate the cause of the error rate.

In one embodiment, the remediation may include restricting a format for data entry for the data element associated with the one of the plurality of processes.

In one embodiment, the data quality management engine may be configured to adjust the error rate threshold based on an outcome of the one of the plurality of processes being with tolerance.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Figure 1:
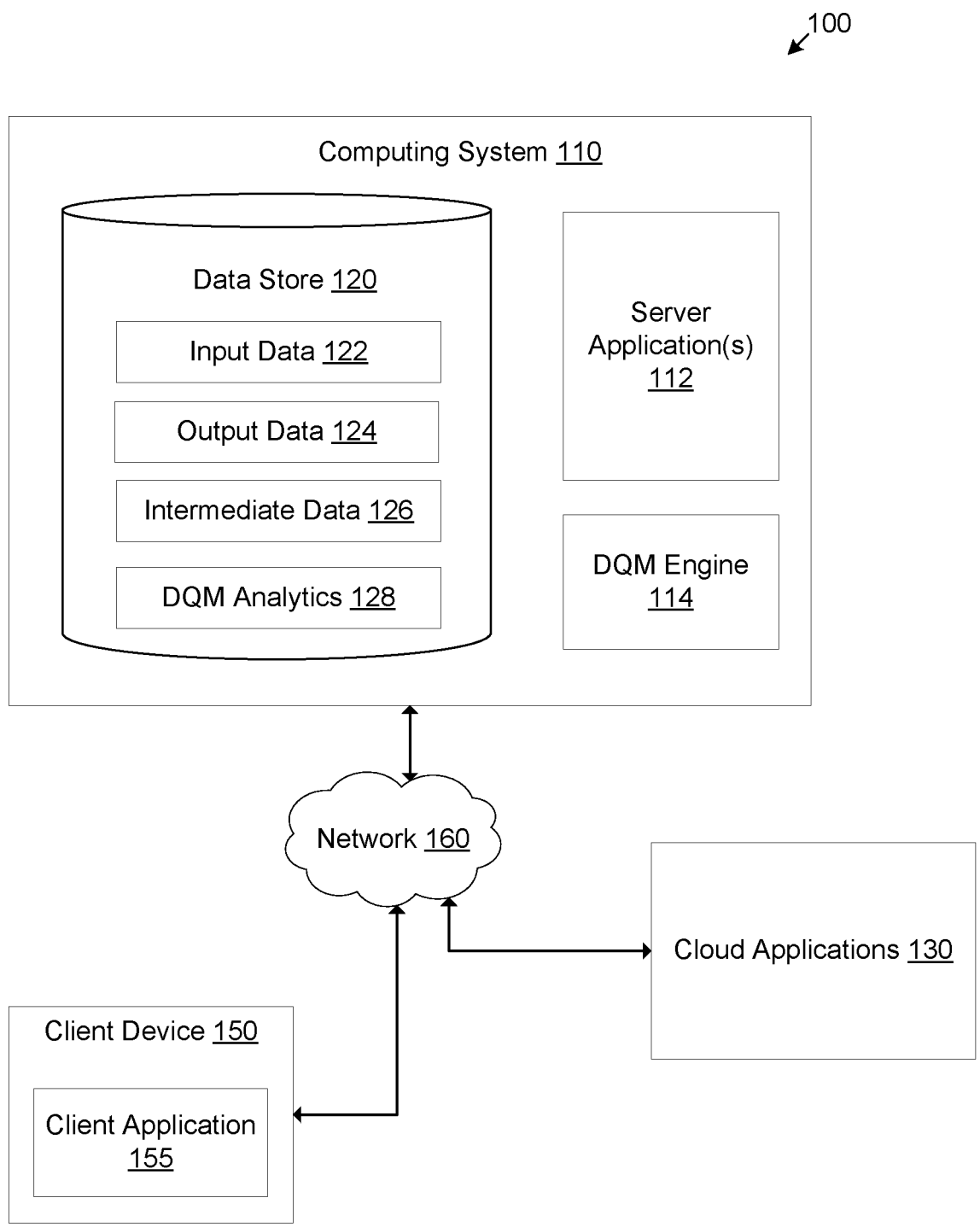
FIG. 1 illustrates a networked environment according to one embodiment.

Exemplary embodiments will now be described in order to illustrate various features. The embodiments described herein are not intended to be limiting as to the scope, but rather are intended to provide examples of the components, use, and operation of the invention.

Embodiments are directed to systems and methods for Data Quality Management (DQM) of data feeds processed in a computing environment. Data feeds are processed and the results may be subject to reporting and auditing to comply with regulators. In some embodiments, a Data Quality Management engine may provide the mapping of Risk Models associated with a Data Element used by an institution's enterprise application (e.g., a data lineage mapped by unique ID for a System of Record (SOR), Authorized Data Source (ADS), Schema, Table, Column, Field/Data Element to Model_Matrix_ID) for passing Financial Audits (e.g., audits made according to the Gramm-Leach-Bliley Act, Dodd-Frank Act, etc.), Privacy Audits (e.g., audits made according to GDPR in Europe, the California Consumer Privacy Act, etc.), or any legislation concerning the digital supply chain. An ADS refers to an alternate location to a source of data that may enforce data quality to ensure that the data can be trusted. In one embodiment, once opened, Risk Models may be posted and/or presented to the new Field/Data Element to Model_Matrix_ID. This may extend to Reports, Models, QMs and Strategies. This extends to internal data monetization.

In one embodiment, a Data Quality Management engine may provide the visualization of data lineage associated with a data element used by an institution's enterprise application (e.g., a data lineage mapped by unique ID for SOR or ADM to Schema, Table, Column, Field/Data Element) for passing an Audit. In one embodiment, once opened, visual data lineage may open and/or present a Graphical User Interface (GUI) with schema, table, column, field/data element attributes. This may assist in determining critical feeds and required Service Level Agreements (SLA's); building data validation rules for critical elements; designing and implementing the operating model for an organization's officer or manager; validating monthly data reporting and data validation reporting to protect potential economic gains for internal data monetization; and ensuing compliance by removing limits of internal structure through DQM and restructuring existing banking data systems.

In one embodiment, an automated by schema change a Metadata Repository (MDR) system is a core-component of the Data Quality Management, or DQM. An MDR may store information about data such as, for example, the source of the data, a description of the data, data quality rules, a list of data sources that are storing the data, the type of data store that is storing the data (e.g., a SOR or ADS, etc.), retention periods of the data, or other information about the data. Approved data review board changes made to a SOR or ADM may be received by the MDR system by taking the system change in a repository or SQL Query to be executed and performing any necessary metadata recognition, etc. for updating data mapping.

In one embodiment, multiple Data Management Portal systems may be edited by data stewards and changes may be updated in a schema-driven MDR system. This may create feed and data documentation in a consistent template.

Embodiments of the present disclosure may lead to a variety of benefits. For example, some embodiments may achieve cost reduction by using data to increase productivity or reduce consumption and waste (either of raw materials or low-value activities). Some embodiments may lead to revenue growth by using data to improve sales performance or reduce customer attrition. Some embodiments may allow: (1) the identification of available data sources—this may include data currently available for monetization as well as other external data sources that may enhance the value of what's currently available; (2) the ability to connect, aggregate, attribute, validate, authenticate, and exchange data—this may allow data to be converted directly into actionable or revenue generating insight or services; (3) the setting of terms and prices and facilitating data trading—that may involve methods for data vetting, storage, and access. For example, many global corporations have locked and siloed data storage infrastructures, which hinders efficient access to data and cooperative and real-time exchange; (4) the performance of research and analytics—this may provide drawing predictive insights from existing data as a basis for using data to reduce risk, enhance product development or performance, or improve customer experience or business outcomes; (5) the action and leveraging of data—the last phase of monetizing data may include determining alternative or improved data centric products, ideas, or services. Examples may include real-time actionable triggered notifications or enhanced channels such as web or mobile response mechanisms; and/or (6) the alignment with regulators for compliance agencies concerning ownership of data and abiding with financial, data, and privacy laws.

FIG. 1 illustrates a networked environment 100 according to an embodiment. The networked environment 100 includes a computing system 110 that may be made up of a combination of hardware and software. The computing system 110 may comprise, for example, a server computer or any other system providing computing capability. Alternatively, the computing system 110 may employ a plurality of computing devices that may be arranged, for example, in one or more server banks or computer banks or other arrangements. Such computing devices may be located in a single installation or may be distributed among many different geographical locations. For example, the computing system 110 may include a plurality of computing devices that together may comprise a hosted computing resource, a grid computing resource and/or any other distributed computing arrangement. In some cases, the computing system 110 may correspond to an elastic computing resource where the allotted capacity of processing, network, storage, or other computing-related resources may vary over time. The computing system 110 may implement one or more virtual machines that use the resources of the computing system 110. Various software components may be executed on one or more virtual machines.

Various applications and/or other functionality may be executed in the computing system 110 according to various embodiments. For example, the computing system 110 may include one or more server applications 112 and one or more DQM engines 114. The server applications 112 may perform a variety of functions that operate on data such as generating new data from input data, reformatting files, converting files into a target format, performing data analytics to generate reports, performing Extract Transfer Load (ETL) operations, or other data manipulation operations. The server applications 112 may operate in a Hadoop environment. For example, the Hadoop environment may be configured to package and redistribute data according to a framework.

The DQM engine 114, may include several processes including example, subroutines, modules, or programs that operate on data at various stages as they are being processed by one or more server applications 112. The DQM engine 114 may provide a user interface that is rendered on a client device to monitor the results of the DQM engine 114.

The computing system 110 may also include a data store 120. Various data may be stored in the data store 120 or other memory that may be accessible to the computing system 110. The data store 120 may represent one or more data stores 120. The data store 120 may include one or more databases. The data store 120 may be used to store data that is processed or handled by the server applications 112, DQM engine 114, or data that may be processed or handled by other applications executing in the computing system 110.

The data store 120 may include input data 122, output data 124, intermediate data 126, and DQM analytics 128. The input data 122 may comprise one or more data feeds. Data feeds may originate from an external source such as, for example, third party services. Data feeds may also originate from an internal source such as, for example, a mainframe-based application. These data sources may comprise applications that generate data feeds on a periodic basis such as, for example, on an hourly or daily basis. Data feeds may also be generated dynamically by an application of a data source.

For example, a data feed may include banking account information such as account numbers, account type, balances, transaction data (e.g., debit credit, etc.), payment history, account ownership status (e.g., joint account, relationship status, etc.), account level scores or account analytics (e.g., the probability of pay back, the probability that account will default, a forecast if account default, etc.), or other bank account information. The data feed may include customer account information such as, for example, customer name, address, phone number, social security number, tax identifiers, customer identifiers, customer preferences.

The input data 122 may be processed by one or more server applications 112 to generate output data 124. The output data 124 may comprise analytics, scores, reports, data logs, or other data that is based on processing the input data 122. As the input data 122 is processed to generate output data 124, intermediate data 126 may be generated. For example, the input data 122 may be processed, formatted, transported, or otherwise manipulated into intermediate data 126 before generating output data 124.

The DQM analytics 128 may be generated by the DQM engine 114. The DQM analytics 128 may include identified errors, health check results, data quality analysis, and/or reports relating to the quality and integrity of the output data 124 or intermediate data 126 as it is being processed.

The networked environment 100 may include one or more cloud applications 130. A cloud application 130 may be considered an external source provided by a third-party. The server applications 112 may communicate with a cloud application 130 using an Application Programming Interface (API) to make function calls to offload processing of data.

The networked environment 100 may further include one or more client devices 150. A client device 150 may be, for example, a cell phone, laptop, personal computer, mobile device, or any other computing device used by a user. The client device 150 may be connected to or otherwise include a scanner, camera, or other sensor to capture a picture. The client device 150 may execute a client application 155. A client application 155 may be a web browser or dedicated mobile application. The client application 155 may provide a portal to access the functionality of the DQM engine 114 and render a user interface provided by the DQM engine 114.

Components of the networked environment such as, for example, the computing system 110, cloud applications 130, and client devices 150 may be connected to a network 160 such as the Internet, intranets, extranets, wide area networks (WANs), local area networks (LANs), wired networks, wireless networks, or other suitable networks, etc., or any combination of two or more such networks. In this respect, the network 160 may provide a communication in a client-server system to allow client devices to communicate with a computing system 110 and to allow a computing system 110 to distribute functionality or outsource operations to cloud applications 130.

Next is a description of exemplary operations that may take place in the networked environment 100.

The output data 124 may be subject to data audits, compliance audits, financial audits, or other validation or compliance procedures. For example, the output data 124 may be subject to validation processes to properly identify risk, loss forecasting, or other compliance measures. The output data 124 may be used to determine whether a loan application or credit card application should be approved. The output data 124 may include data that is reported to a credit card bureau or to a customer. Therefore, the output data 124 should be free of error and should be trusted by entities relying on the accuracy of the output data 124.

To generate the output data 124, input data 122 is transformed, manipulated, transmitted, processed, and/or analyzed by server applications 112 and/or cloud applications 130. The input data 122 may be subject to automated processes, ETL processes, file movement processes, batch processing, processed by automated scripts, and/or manually edited. The processing of the input data 122 generates intermediate data 126 and eventually output data 124. The intermediate data 126 and output data 124 may be subject to data quality issues, errors, discrepancies, or inaccuracies.

An example of an error is the inadvertent flipping of a number sign where a number that should be positive is negative, or vice-versa. For example, an automated process of a server application 112 that aggregates account balances from multiple sources may inadvertently flip a negative balance to a positive balance.

As another example, a server application 112 that prompts a user to input an account name for a mortgage application may lead to human error of an incorrect name being entered. As another example, file movement process may incorrectly populate a database table with erroneous field values or there may be errors with an ETL operation. As another example, the batch processing of a source system might not properly occur and the wrong file may be incorrectly transmitted.

To improve data quality, the DQM engine 114 may implement several processes. For example, a data element may first be identified in the input data 122, where a data element is considered a valuable piece of information such as, for example, an account name, an account balance, a risk score, etc. The DQM engine 114 may implement one or more rules as the output data 124 is being generated. For example, an account balance rule may be implemented as intermediate data 126 is generated to ensure that a calculated account balance is acceptable or otherwise possible. As another example, a checksum, average, other statistical calculation, hash or other function applied to data as it is stored in between two processes. A checksum, average, or mean, may be used to ensure values are missing, but may not be able to detect if values are transposed. Other functions may be used to check whether a data array or vector is correct according to the order of values.

Another data check may be a rule such as whether the outstanding mortgage balance or other account balance is greater than a predefined size. This may be used to ensure that certain values cannot exceed theoretical or practical limits imposed by business practices, regulations, or compliance requirements.

The DQM engine 114 may also generate a data lineage to track a data element as it is processed. This may involve identifying the source of the data element, the server applications 112 or cloud applications 130 that manipulated or handled a data element. The DQM engine 114 may generate a log file to track the various server applications 112 or cloud applications 130 with respect to the processing of a data element. The log file may reference a data element by a data element identifier as it is being processed. The DQM engine 114 may extract metadata or schema of the data as it is being processed.

In some embodiments, a file definition may be used to define the scheme of a file that contains the data element. The DQM engine 114 may validate the file content around the schema of the file. In other embodiments, artificial intelligence or machine learning may be used to interpret the appropriate scheme of a file to determine what the scheme should be and uses the results to validate the file. Ultimately, the contents of the file may be validated against the pre-defined schema to detect a mismatch. The validation may be recorded as DQM analytics 128.

The results of the DQM engine 114 may generate a user interface including the lineage of one or more data elements, where the lineage indicates the identities of processes that handled the data element. The user interface may include the results of each data quality check as the data element is being processed. The user interface may also include a dashboard indicating the errors in transmission or results of each check that may have failed.

In some embodiments, the DQM engine 114 calculates an error rate for each check. If the error rate exceeds a threshold amount, the DQM engine 114 may be configured to communicate with the process associated with the high error rate and cause the process to halt or terminate.

Figure 2:
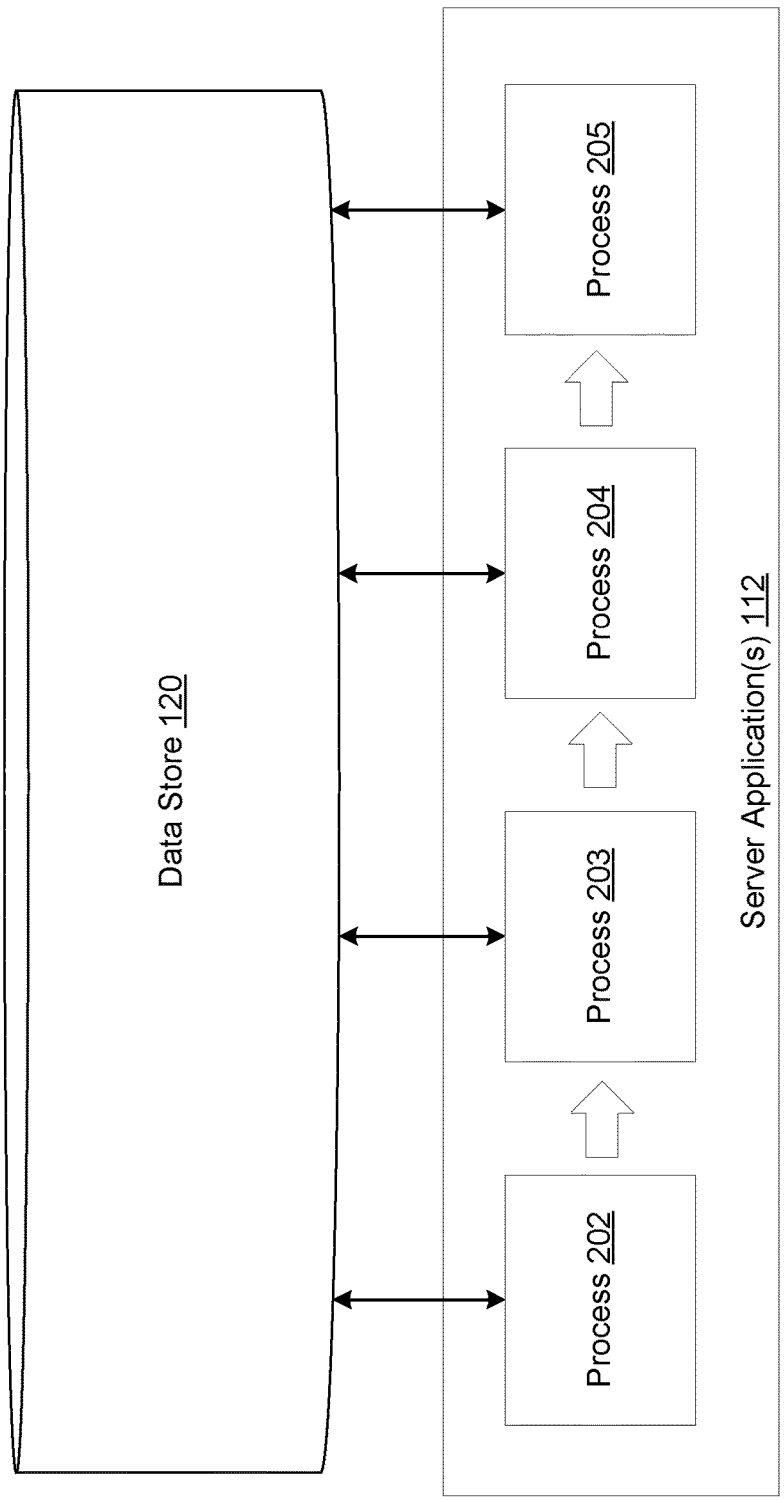
FIG. 2 depicts a multi-hop process in a networked environment according to one embodiment.

FIG. 2 depicts a multi-hop process in a networked environment according to various embodiments. In FIG. 2, one or more server applications 112 execute and perform one or more processes 202-205. For example, each server application 112 may correspond to a separate process 202-205, or a server application 112 may be divided into multiple processes. A first process may obtain input data 122 from a data store 120 and process it and then store it as intermediate data 126 in the data store 120. A second process 203 may access the intermediate data 126, process it and generate new intermediate data 126 that is stored in the data store 120. A third process 204, may continue to process the intermediate data 126 generated from the second process 203 by accessing it from the data store 120 and storing the results in the data store 120. A fourth process 205 may generate output data 124 from the intermediate data 126 generated by the third process 204.

FIG. 2 shows data being processed as it hops from a first process 202 to a second process 203 to a third process 204 and to a fourth process 205. In some embodiments, data from one process 202-203 may be passed directly to a subsequent process 204-205 using a functional call, API, or request comprising a payload that contains intermediate data 126. For example, data may be passed from between processes 202-205 such that it is streamed from one process to the next. In this respect, upon processing data, a particular process 202-204 may stream or otherwise transmit the result to the next process 203-205.

A particular process 202-205 may comprise one or more subroutines, sub-processes, or operations, such as, for example, communicating with a cloud server to process the data. A process 202-205 may be, for example, obtaining user input to complete a loan application, an algorithm to generate a customer risk score, a data aggregator to collect account information to generate a report for a credit bureau, or any other process that manipulates and generates data involving customer accounts, financial information, or data analytics.

To ensure data quality the DQM engine 114 may implement one or more rules between a particular hop. For example, if the second process 203 generates a risk score indicating the likelihood that a customer may overdraft an account, the DQM engine 114 may implement a rule after the second process 203 to check for scores above or below a threshold to identify outliers. The risk score may be considered a data element in a data feed or intermediate data. Results of implementing this rule may be recorded as DQM analytics 128. In this example, the DQM analytics 128 may indicate the percentage of scores that are outside a threshold range. This may help evaluate whether the second process 203 is accurately calculating scores. For example, if half the scores fall outside a threshold range such that they are deemed outliers, then this result may suggest that the second process 203 is not properly calculating a score.

To ensure data quality, the DQM engine 114 may also implement a data function such as a checksum, hash, average, or other function to ensure that data values have not changed. For example, a first process 202 may generate a payment transaction history for each customer. A second process 203 may reformat or load the transaction history into a different database. And a third process 204 may manipulate or process the transaction history after it has been reformatted or loaded.

The DQM engine 114 may perform a function on data elements in the transaction history (e.g., the amounts of each line item) after the first process 202 and after the second process 203 to ensure that the information expressed in the transaction history did not change. For example, the DQM engine 114 may generate an average value of the line items in each transaction history at one or more hops to check whether the second process 203 did not erroneously modify the data as it reformatted it or loaded it into a new database. The average values at one or more hops may be compared as a validity check. If the values do not match, an error is generated and stored as DQM analytics 128. The error rates for a particular check may be tracked and reported as DQM analytics 128 to evaluate the efficacy of a particular process 202-205.

The DQM engine 114 may also track the data lineage as a data element passes through multiples hops of multiple processes 202-205. For example, an identifier of the process 202-205 that is processing a data element may be recorded in a data log.

Figure 3:
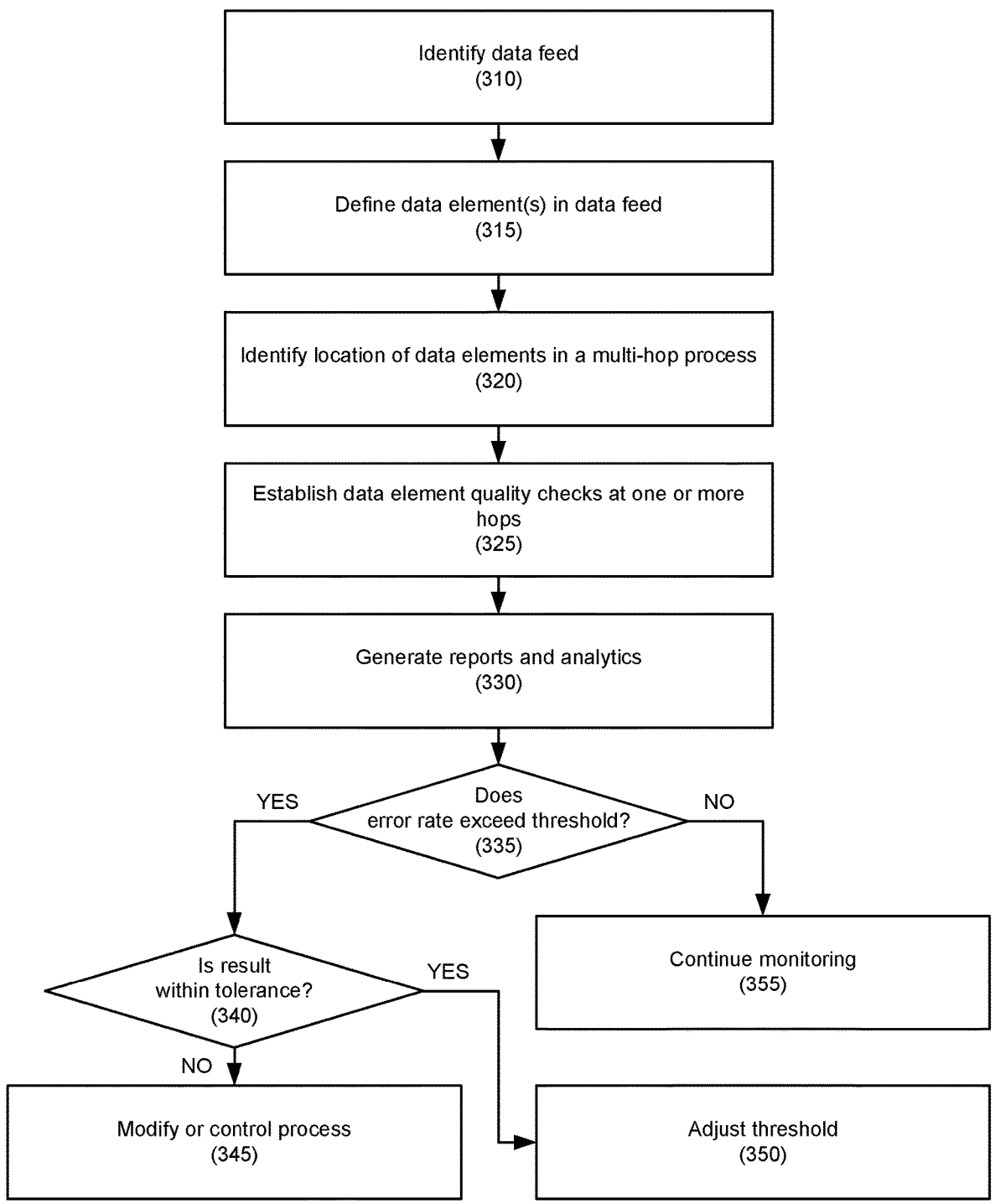
FIG. 3 flowchart illustrating a method for implementing data quality management in a networked environment according to one embodiment.

FIG. 3 is a flowchart illustrating a method for implementing data quality management in a networked environment according to an embodiment.

In step 310, a data quality management engine may identify one or more data feeds. In embodiments, a data feed may be from a source of data, such as an application, a web interface, a system, a database, etc. The identification of the data feed may be stored in a data store along with information regarding the data feed, such as an identification of the source of the data feed (e.g., an application, website entry, a third party, etc.) and the manner in which the data in the data feed is generated (e.g., manually keyed in, scanned in, automatically populated, etc.).

In step 315, data elements in the data feed may be defined. A data element may be a data field in the data feed, or actual data in the data feed, or a combination thereof. For example, a data element may be a data field such as a contact field (e.g., name, address, phone number, social security number, etc.), an account information field (e.g., account numbers, transactions, balances, etc.), a data analytic (e.g., a customer score, a risk score, etc.), or any other substantive data field as is necessary and/or desired. In one embodiment, a data element may be the output of a process, such as a calculation, a transformation, a qualification, an error, etc.

In step 320, one or more processes in a multi-hop process involving the data elements may be identified. For example, a data element may undergo an operation, such as an interaction, a manipulation, a modification, a transformation, etc. by a process. The data quality management engine may identify the processes that operate on the data element, the locations (e.g., servers, applications, etc.) in which the data elements are operated on, the locations in which the data elements may be stored, including before, during, and after the operation, as well as any sequence in which the data elements are operated on.

In step 325, the data quality management engine may perform a data element quality check at one or more of the identified processes. For example, the data quality management engine may implement a check before and/or after each operation involving a data element. For example, a check may be performed on the data element when it is first received from the data source (e.g., when it is loaded from an application), before and/or after each operation, etc.

In one embodiment, a rule may be applied at each check, such as to apply a threshold to identify values that are considered errors or outliers. For example, the rule may compare a data element value to an expected value or threshold. If the data element does not meet the expected value or a threshold, the data quality management engine may classify the process as causing the error.

The check may also apply a function to the data element at several processes to see if values in the data element has inadvertently changed. For example, a function may be a checksum, hash, average, mean, median, or other mathematical or algorithmic function. The results of two checks may be compared to determine if the data contains an error.

In step 330, the data quality management engine may generate reports and/or analytics. For example, the data quality management engine may generate error rates corresponding to each check. An error rate may track the percentage or number of times a rule is triggered, the number of times a check results in an error, the magnitude of the error, etc. The reports and analytics may be stored in a data store as analytics. In embodiments, a dashboard may be generated and the reports and analytics are presented to a client device.

In step 335, the data quality management engine may determine whether an error rate exceeds a threshold may be performed. For example, the error rate at the check may be compared to a threshold error rate, which may be based on a default value, machine learning based on historical error rates, etc. If the error rate does not exceed the threshold, the process may continue to monitor, evaluate other processes, etc.

If the error rate exceeds the threshold, in step 340, the error rate may optionally be compared to an outcome associated with the data field. If the outcome is within tolerance, in step 350, the threshold may be adjusted using, for example, a trained machine learning engine. For example, if the tolerance is 5% error rate, and a 6% error rate does no produce results that are out of tolerance, the tolerance may be adjusted to 6%.

In one embodiment, in response to the error rate exceeding a threshold, the data quality management engine may stop processing the data element and may analyze the errors to determine if the errors are significant. For example, the analysis may be conducted manually, or it may be automated by comparing error to an on-going data profiling step, which may be used to adjust the threshold value.

Other manners for adjusting the threshold may be used as is necessary and/or desired.

If the result is not within tolerance, in step 355, the data quality management engine may continue to monitor processes.

If the result is not within tolerance, in step 345, one or more automated actions may be taken. For example, the process(es) involved in the error may be investigated, modified and/or controlled. For example, if the error rate exceeds the threshold, the process(es) involved in the error may be automatically suspended. An alert may be generated and a user dashboard may be updated to indicate the identities of any processes that have been automatically suspended.

In one embodiment, a known solution may be applied to the process. For example, if the error rate is the result of alpha characters being entered into a numeric field, the process may be modified to only accept numeric characters and prevent the entry of alpha characters.

As another example, one of the data sources or systems may have a software defect in which, for example, tax identifier fields are populated with phone numbers. Using, for example, machine learning, the data quality management engine may identify that the format of the data populating the tax fields is a phone number format, and may then mediate the defect in the data source or system.

Although several embodiments have been disclosed, it should be recognized that these embodiments are not exclusive to each other, and certain elements or features from one embodiment may be used with another embodiment.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor. As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processors and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communication technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Java, Python, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A computer-implemented method for data quality management, comprising:
    identifying, by a data quality management engine, a data feed from a data source;
    defining, by the data quality management engine, a data element in the data feed;
    identifying, by the data quality management engine, a plurality of processes in a multi-hop process involving the data element;
    executing, by the data quality management engine, a data quality check on the data element for each process of the plurality of processes based on an expected value for the data element at each process;
    identifying, by the data quality management engine, an error rate with one of the plurality of processes;
    determining, by the data quality management engine, that the error rate exceeds an error rate threshold for the one of the plurality of processes; and
    stopping, by the data quality management engine, processing of the data element in response to the error rate exceeding the error rate threshold.

2. The computer-implemented method of claim 1, wherein the data source comprises a system, a program, and/or an application.

3. The computer-implemented method of claim 1, wherein the identification of the data feed further includes a manner in which data in the data feed is received.

4. The computer-implemented method of claim 1, wherein the data element comprises a data field and/or data in the data field.

5. The computer-implemented method of claim 1, wherein the error rate is based on a number of times that the plurality of processes trigger rule.

6. The computer-implemented method of claim 5, wherein the rule identifies a data element that is an error or an outlier.

7. The computer-implemented method of claim 1, further comprising:
    adjusting, by the data quality management engine, the error rate threshold based on an outcome of the one of the plurality of processes being within tolerance.

8. A computer-implemented method for data quality management, comprising:
    identifying, by a data quality management engine, a data feed from a data source;
    defining, by the data quality management engine, a data element in the data feed;
    identifying, by the data quality management engine, a plurality of processes in a multi-hop process involving the data element;
    executing, by the data quality management engine, a data quality check on each process of the plurality of processes;
    identifying, by the data quality management engine, an error rate with one of the plurality of processes;
    determining, by the data quality management engine, that the error rate exceeds an error rate threshold for the one of the plurality of processes;
    identifying, by the data quality management engine, a cause of the error rate, wherein the cause of the error rate is associated with the one of the plurality of processes; and
    remediating, by the data quality management engine, the cause of the error rate, wherein the remediation comprises restricting a format for data entry for the data element associated with the one of the plurality of processes.

9. A data quality management engine, comprising:
    an electronic device comprising at least one processor; and
    a memory comprising a data quality management computer program;

wherein the data quality management engine is configured to:
 identify a data feed from a data source;
 define a data element in the data feed;
 identify a plurality of processes in a multi-hop process involving the data element;
 execute a data quality check on the data element for each process of the plurality of processes based on an expected value for the data element at each process;
 identify an error rate with one of the plurality of processes;
 determine that the error rate exceeds an error rate threshold for the one of the plurality of processes; and
 stop processing of the data element in response to the error rate exceeding the error rate threshold.

10. The data quality management engine of claim 9, wherein the data source comprises a system, a program, and/or an application.

11. The data quality management engine of claim 9, wherein the identification of the data feed further includes a manner in which data in the data feed is received.

12. The data quality management engine of claim 9, wherein the data element comprises a data field and/or data in the data field.

13. The data quality management engine of claim 9, wherein the error rate is based on a number of times that the plurality of processes trigger a rule.

14. The data quality management engine of claim 13, wherein the rule identifies a data element that is an error or an outlier.

15. The data quality management engine of claim 9, wherein the data quality management engine is configured to identify a cause of the error rate, wherein the cause of the error rate is associated with the one of the plurality of processes, and remediate the cause of the error rate, and the remediation comprises restricting a format for data entry for the data element associated with the one of the plurality of processes.

16. The data quality management engine of claim 9, wherein the data quality management engine is configured to adjust the error rate threshold based on an outcome of the one of the plurality of processes being within tolerance.

* * * * *